United States Patent
Zhang et al.

(10) Patent No.: US 12,259,932 B2
(45) Date of Patent: *Mar. 25, 2025

(54) FOCUSED URL RECRAWL

(71) Applicant: Palo Alto Networks, Inc., Santa Clara, CA (US)

(72) Inventors: Lei Zhang, San Jose, CA (US); Lin Xu, Saratoga, CA (US); Seokkyung Chung, San Jose, CA (US); Xunhua Tong, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,129

(22) Filed: Aug. 3, 2021

(65) Prior Publication Data

US 2021/0365503 A1 Nov. 25, 2021

Related U.S. Application Data

(63) Continuation of application No. 15/445,550, filed on Feb. 28, 2017, now Pat. No. 11,216,513.

(51) Int. Cl.
| | | |
|---|---|---|
| *G06F 16/951* | (2019.01) | |
| *G06F 16/28* | (2019.01) | |
| *G06F 16/335* | (2019.01) | |
| *G06F 16/353* | (2025.01) | |
| *G06F 16/955* | (2019.01) | |

(52) U.S. Cl.
CPC .......... *G06F 16/951* (2019.01); *G06F 16/285* (2019.01); *G06F 16/335* (2019.01); *G06F 16/353* (2019.01); *G06F 16/9566* (2019.01)

(58) Field of Classification Search
CPC .. G06F 16/285; G06F 16/9566; G06F 16/951; G06F 16/953; G06F 16/9532; G06F 16/9538; G06F 16/335; G06F 16/353; G06F 21/566
See application file for complete search history.

(56) References Cited

U.S. PATENT DOCUMENTS

| | | | |
|---|---|---|---|
| 8,078,615 B2 * | 12/2011 | Smith | G06F 16/9535 |
| | | | 715/810 |
| 8,078,625 B1 | 12/2011 | Zhang | |
| 8,521,667 B2 | 8/2013 | Zhu | |
| 10,218,716 B2 * | 2/2019 | Huang | G06F 21/562 |
| | (Continued) | | |

OTHER PUBLICATIONS

Chakrabarti et al., "Focused crawling: a new approach to topic-specific Web resource discovery". Computer networks, 31(11-16), 1623-1640. 1999.

Hernández et al., "A statistical approach to URL-based web page clustering". In Proceedings of the 21st International Conference on World Wide Web (WWW '12 Companion). ACM, New York, NY, USA, 525-526. 2012.

(Continued)

*Primary Examiner* — Marcin R Filipczyk
(74) *Attorney, Agent, or Firm* — Van Pelt, Yi & James LLP

(57) ABSTRACT

A website misclassification report is received. A determination is made that a current classification model correctly classifies a website. The current classification model is different from a model that was previously used to classify the website. In response to a determination that the website is correctly classified by the current classification model, a reclassification operation is performed, using the current classification model, on a second website.

19 Claims, 4 Drawing Sheets

(56) References Cited

U.S. PATENT DOCUMENTS

| | | | | |
|---|---|---|---|---|
| 2014/0229164 | A1* | 8/2014 | Martens | G06F 40/279 |
| | | | | 704/9 |
| 2014/0372715 | A1* | 12/2014 | Bak | G06F 12/126 |
| | | | | 711/158 |
| 2016/0065534 | A1* | 3/2016 | Liu | G06F 16/287 |
| | | | | 707/728 |
| 2016/0065634 | A1* | 3/2016 | Pati | H04L 65/611 |
| | | | | 709/219 |
| 2017/0330107 | A1* | 11/2017 | Gonzalez Sanchez | |
| | | | | G06N 20/10 |
| 2017/0346845 | A1* | 11/2017 | Dinerstein | H04L 63/105 |
| 2018/0137560 | A1 | 5/2018 | Chopra | |
| 2018/0246983 | A1* | 8/2018 | Rathod | G06F 16/972 |
| 2018/0375745 | A1* | 12/2018 | Balupari | H04L 43/0876 |
| 2022/0101948 | A1* | 3/2022 | Cooper | C12N 9/485 |

OTHER PUBLICATIONS

Kan et al., "Fast webpage classification using URL features", In Proceedings of the 14th ACM international conference on Information and knowledge management (CIKM '05). ACM, New York, NY, USA, 325-326. 2005.

Pant et al., "Learning to crawl: Comparing classification schemes". ACM Trans. Inf. Syst. 23, 4, 430-462. Oct. 2005.

Rajalakshmi et al., "Web page classification using n-gram based URL features," 2013 Fifth International Conference on Advanced Computing (ICoAC), Chennai, pp. 15-21. 2013.

Richardson et al., "Beyond PageRank: machine learning for static ranking". In Proceedings of the 15th international conference on World Wide Web (WWW '06). ACM, New York, NY, USA, 707-715. 2006.

* cited by examiner

FOCUSED URL RECRAWL

CROSS REFERENCE TO OTHER APPLICATIONS

This application is a continuation of U.S. patent application Ser. No. 15/445,550 entitled FOCUSED URL RECRAWL filed Feb. 28, 2017 which is incorporated herein by reference for all purposes.

BACKGROUND OF THE INVENTION

Firewalls and other security devices/programs typically enforce policies against network transmissions based on a set of rules. In some cases, the rules may be based on uniform resource locator (URL) information, such as by preventing a user from accessing a specific URL (e.g., denying access to http://www.example.com), or by preventing a user from accessing a category of the URL (e.g., denying access to sites classified as "social networking" sites or "pornographic" sites). Unfortunately, URLs may be misclassified, meaning that (for example) a user may be prevented from accessing a website to which they should be allowed access. Given the sheer volume of URLs in existence, it can be difficult to ensure that URLs are correctly classified.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
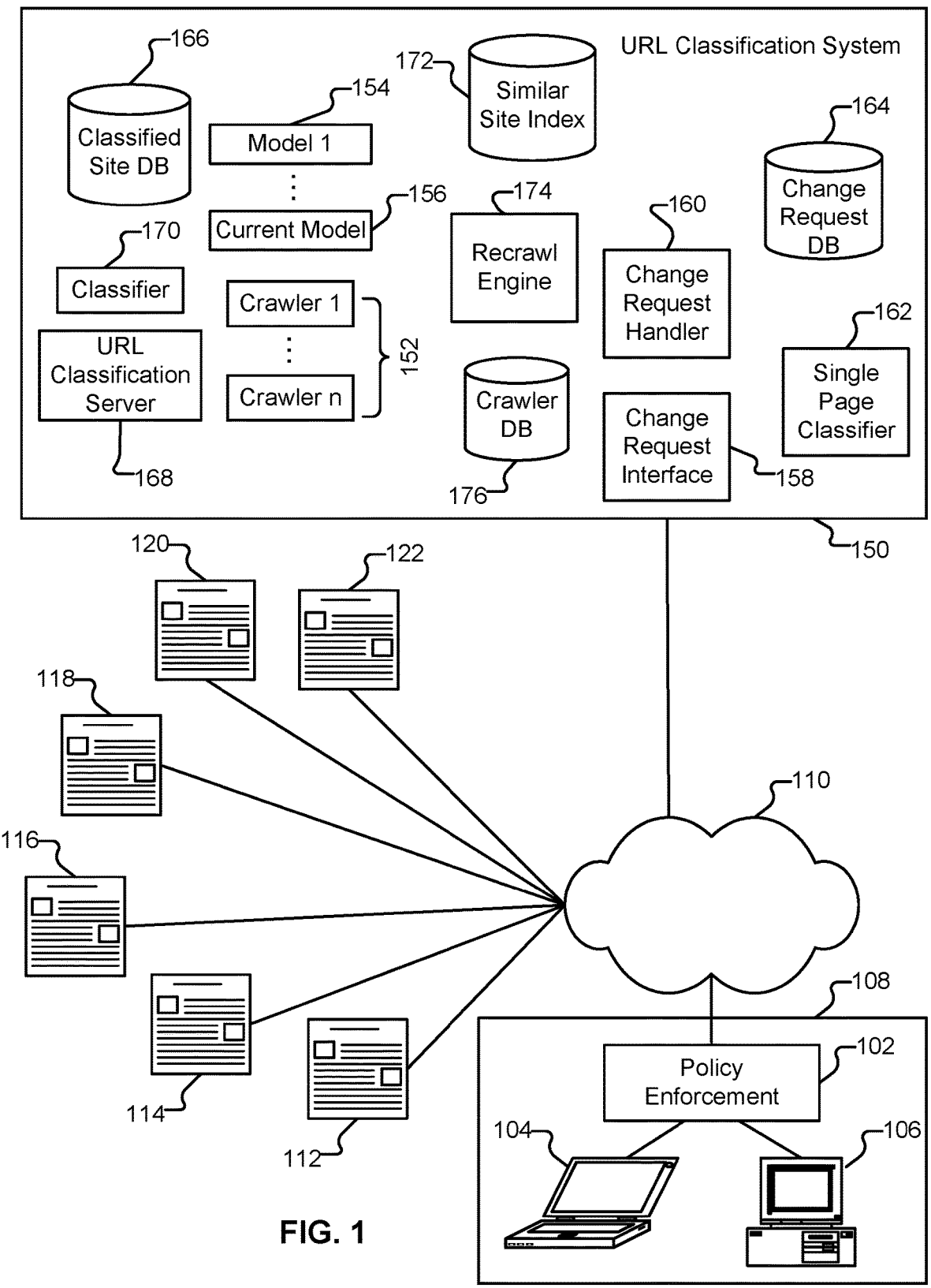
FIG. 1 illustrates an embodiment of an environment in which policies that include URL information are enforced.

FIG. 1 illustrates an embodiment of an environment in which policies that include URL information are enforced. In the example shown in FIG. 1, clients 104 and 106 are a laptop computer and desktop computer, respectively, present in an enterprise network 108. Policy enforcement appliance 102 (also referred to herein as "appliance 102") is configured to enforce policies regarding communications between clients, such as clients 104 and 106, and nodes outside of enterprise network 108 (e.g., reachable via external network 110). One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access to streaming video website 116, subject to a bandwidth or other consumption constraint. Access to other sites (e.g., news site 118) can be explicitly permitted (e.g., a rule allowing access to site 118 via URL ("www.examplenews.com") or category ("news")), and can also be permitted by virtue of not being prohibited (e.g., "access to any site not prohibited is allowed"). Other types of policies can also be enforced, such as ones governing traffic shaping, quality of service, or routing with respect to a given URL, pattern of URLs, category of URL, or other URL information. In some embodiments, policy enforcement appliance 102 is also configured to enforce policies with respect to traffic that stays within enterprise network 108.

The functionality provided by policy enforcement appliance 102 can be implemented in a variety of ways. Specifically, policy enforcement appliance 102 can be a dedicated device or set of devices. The functionality provided by appliance 102 can also be integrated into or executed as software on a general purpose computer, a computer server, a gateway, and/or a network/routing device. Further, whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Also shown in FIG. 1 is a URL classification system 150. URL classification system 150 uses a set of crawlers 152 to crawl sites (e.g., sites 112-122), extract metadata/content, and store information associated with the crawled sites (including the time of the crawl) in database 166. Where multiple crawls of a site are performed, the historical crawl information (e.g., results of first crawl, second crawl, etc.) are preserved in database 166, along with results of the current crawl. Examples of tools that can be used to crawl/extract content from sites include PageDump (WebKit), HtmlUnit, and jsoup. Database 166 is, in various embodiments, implemented using MongoDB. Example tables that can be included in database 166 are a crawl queue (of sites to be crawled), a crawl log (a history of sites crawled), a classification result (a to-publish category, invalid site, or no category), and a crawl content report (a summary of crawled sites, language, and number of pages crawled). The information extracted for a site (e.g., title, description, body text, keywords, inlinks, outlinks, language, etc.) is used (e.g., by classifier 170) to generate a feature vector (or set of feature vectors, as applicable). One example of a feature is whether or not any of the outlinks of a site lead to sites known to be classified as ADULT sites. Other example features variously include features related to body text, features related to metadata, features related to incoming links, and features related to the URL itself In various embodiments, different features included in a feature vector are used in conjunction with different types of machine learning approaches incorporated into a classification model, such as model 156. Examples of such machine learning approaches include Naïve Bayes, support vector machines, random forest, logistic regression, and gradient descent boosting trees. Classifier 170 uses a model, such as model 156, to classify a given site (e.g., as NEWS, ADULT, etc.) based on its associated feature vector. In various embodiments, a model such as model 156 is trained using a training set of manually labeled websites. Categorizations determined using model 156 are stored in database 166. The contents of database 166 can be used for a variety of purposes, including generating database 312 discussed in conjunction with FIG. 3, and responding to queries (e.g., with classification server 168 being an example of remote URL classification server 320, responding to queries by consulting database 166).

In addition to populating classified site database 166, crawl results for a site are also used (e.g., by Apache Lucene) to populate a similar site index 172. In some embodiments, all crawled sites are included in similar site index 172. In other embodiments, certain classifications of site (e.g., MALWARE site, PHISHING site, parked site, soft 404 error site, etc.), which are included in database 166, are excluded from similar site index 172 (e.g., with a 75 million site subset of the 500 million total sites in database 166 present in index 172). In various embodiments, similar site index 172 is an inverted index, constructed using tokens extracted from the entry/home page of a given domain (and, where applicable, a non MALWARE/PHISHING/parked/soft 404 domain).

In various embodiments, system 150 is implemented using commodity server-class hardware. System 150 can also be constructed using a scalable, elastic architecture, and may comprise several distributed components, including components provided by one or more third parties (e.g., using Amazon Web Services, Microsoft Azure, and/or Google Cloud Platform). Further, when system 150 is referred to as performing a task, such as storing data or processing data, it is to be understood that a sub-component or multiple sub-components of system 150 (whether individually or in cooperation with third party components) may cooperate to perform that task. Unless otherwise specified, various logical components of system 150 are generally implementable in a variety of ways, including as a set of one or more scripts (e.g., written in Java, python, etc., as applicable).

Figure 2:
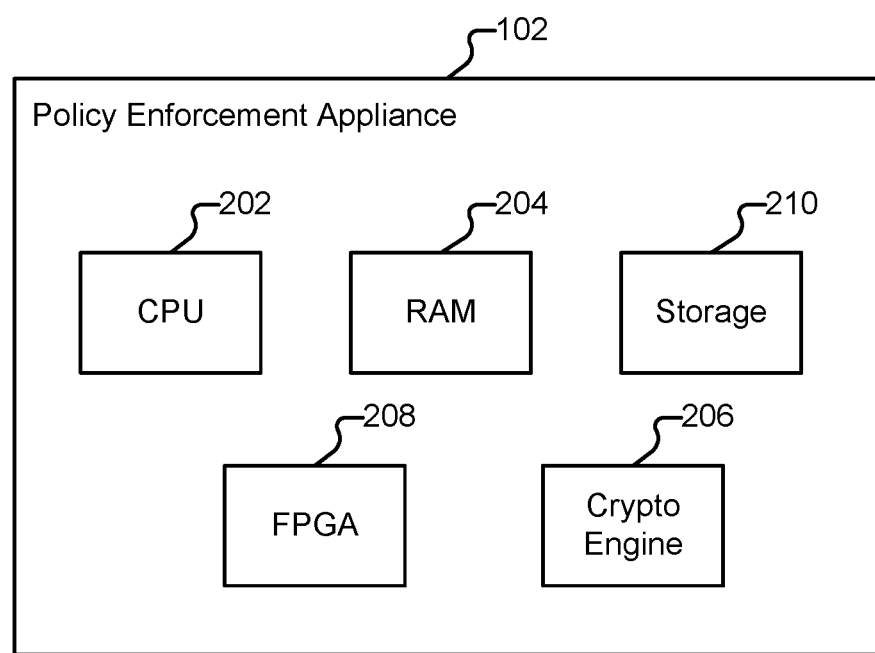
FIG. 2 illustrates an embodiment of a policy enforcement appliance.

FIG. 2 illustrates an embodiment of a policy enforcement appliance. The example shown is a representation of physical components that are included in appliance 102, in some embodiments. Specifically, appliance 102 includes a high performance multi-core CPU 202 and RAM 204. Appliance 102 also includes a storage 210 (such as one or more disk drives), which is used to store policy and other configuration information, as well as URL information. Appliance 102 can also include one or more optional hardware accelerators. For example, appliance 102 can include a cryptographic engine 206 configured to perform encryption and decryption operations, and one or more FPGAs 208 configured to perform matching, act as network processors, and/or perform other tasks.

Figure 3:
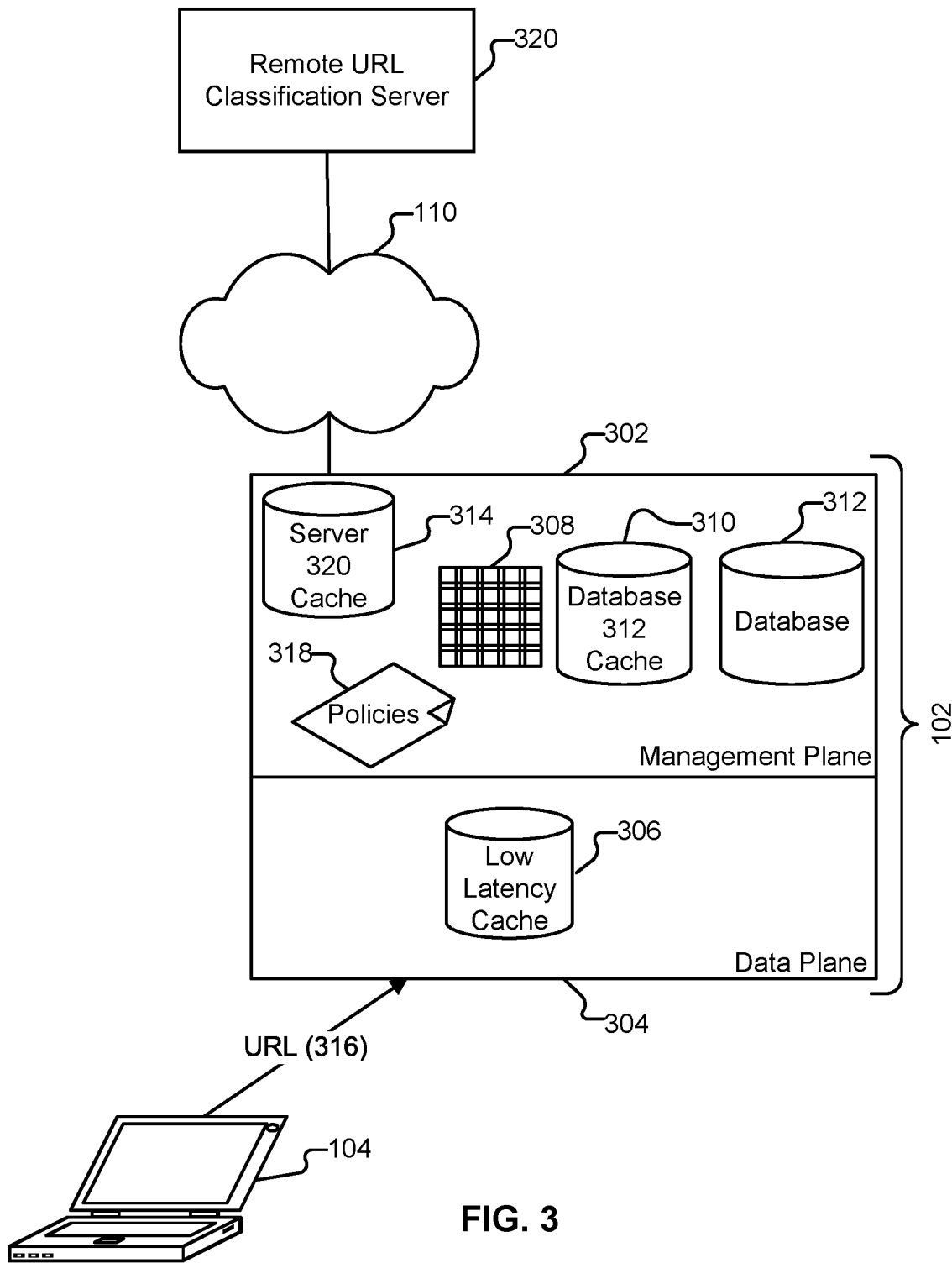
FIG. 3 illustrates an embodiment of a policy enforcement appliance.

FIG. 3 illustrates an embodiment of a policy enforcement appliance. In the example shown, the functionality of policy enforcement appliance 102 is implemented in a firewall. Specifically, appliance 102 includes a management plane 302 and a data plane 304. The management plane is responsible for managing user interactions, such as by providing one or more user interfaces for configuring policies (318), reporting problems, and viewing log data. The data plane is responsible for managing data, such as by performing packet processing (e.g., to extract URLs) and session handling. In various embodiments, a scheduler is responsible for managing the scheduling of requests (e.g., as presented by data plane 304 to management plane 302, or as presented by management plane 302 to a remote URL classification server 320).

One task performed by the firewall is URL filtering. Suppose network 108 belongs to a company, hereinafter referred to as "ACME Corporation." Specified in appliance 102 are a set of policies 318, some of which govern the types of websites that ACME employees may access, and under what conditions. As one example, included in appliance 102 is a policy that permits employees to access news-related websites. Another policy included in appliance 102 prohibits, at all times, employees from accessing pornographic websites. Also included in appliance 102 is a database (312) of URLs and associated categories. Other information can also be associated with the URLs in database 312 instead of or in addition to category information, and that other information can be used in conjunction with policy enforcement.

In some embodiments, database 312 is provided by a third party, such as through a subscription service. In such a scenario, it is possible that instead of the URLs being directly stored in database 312, a transformation is applied to the URLs prior to storage. As one example, MD5 hashes of URLs can be stored in database 312, rather than the URLs themselves. The URLs stored in database 312 (or transformations thereof) represent the top n URLs for which access is most likely to be sought by users of client devices, such as client 104, where n can be configured based on the computing and other resources available to appliance 102. As one example, an embodiment of database 312 includes 20 million URLs and is stored in storage 210. In various embodiments, one or more bloom filters are used by appliance 102 for URL lookups. For example, bloom filter 308 can be compiled from the contents of database 312 and loaded into RAM 204. In some embodiments, the bloom filter is compiled as a bitmask. Whenever changes are made to database 312 (e.g., as an update provided by a vendor), bloom filter 308 is recompiled. Also included in the firewall are various caches (e.g., 306, 310, and 314), also loaded into RAM 204. In some embodiments, all or some of bloom filter 308 and/or caches 306, 310, and 314 are omitted from appliance 102 and the processing described herein is adapted accordingly. In other embodiments, additional bloom filters and/or additional caches are included in appliance 102, as applicable. Additional detail regarding components shown in FIG. 3 will be provided below.

When a user of client 104 (an employee referred to hereinafter as "Alice") attempts to engage in activities, such as web surfing, communications from and to client 104 pass through policy enforcement appliance 102. As one example, suppose Alice has launched a web browser application on client 104 and would like to visit an arbitrary web page. Appliance 102 is configured to evaluate the URL of the site Alice would like to visit (e.g., URL 316) and determine whether access should be permitted.

Suppose Alice would like to visit site 118, the website of a national newspaper, and enters that URL into her browser ("www.examplenews.com"). In some embodiments, the URL (316) is evaluated by appliance 102 as follows. In the first stage of the evaluation, the data plane 304 consults cache 306 for the presence of URL 316 (the results of which are indicative of whether appliance 102 has previously received a request to access site 118 within cache resource constraints). If the URL is present in cache 306, the associated category that is also stored in cache 306 is used to enforce any applicable policies 318 (e.g., allowing Alice access to site 118). If the URL is not present in cache 306, a temporary entry is inserted into cache 306 indicating that the URL is being resolved. As one example, a URL being resolved is assigned a temporary category of "UNRESOLVED." Additional requests received by appliance 102 for access to site 118 (e.g., received from another user such as "Bob," a user of device 106) will be queued pending the resolution. In various embodiments, a timeout condition is placed on UNRESOLVED entries included in cache 306, such that if the entry is not updated within a specified period of time, the entry is removed.

Assuming URL 316 remains unresolved, data plane 304 sends a request to management plane 302 for an evaluation of URL 316. The next stage of evaluation is for management plane 302 to perform a match against bloom filter 308. URL 316 is transformed as applicable (e.g., an MD5 hash of URL 316 is computed). For the remainder of the discussion of this example, no distinction will be made between a URL and the MD5 (or other transformation) of a URL, to aid in clarity. It is to be assumed that if database 312 stores MD5 hashes, the queries performed against it (and the corresponding bloom filter and queries against the bloom filter) will be performed using MD5 (or other applicable) transformations of URLs.

A REJECT response, if received from bloom filter 308 for URL 316, indicates with 100% confidence that URL 316 is not present in database 312. An ACCEPT response indicates that URL 316 is present in database 312, subject to a given false positive rate. The desired false positive rate of bloom filter 308 is configurable and is in some embodiments set at 10%, meaning that an ACCEPT response indicates, with 90% confidence, that the URL is present in database 312. Suppose that a match against bloom filter 308 for URL 316 is performed and the bloom filter reports an ACCEPT (i.e., there is a 90% chance that URL 316 is present in database 312). In some embodiments, cache 310 is evaluated for the presence of URL 316 (indicative of whether database 312 was previously queried for URL 316 within cache resource constraints). Suppose URL 316 is not present in cache 310. A query of database 312 is performed using URL 316. If it is assumed that URL 316 is present in database 312, the corresponding category NEWS is returned and ultimately provided to data plane 304, which will update the entry in cache 306 by changing the UNRESOLVED category to NEWS. The category will be used by the firewall to enforce any applicable rules. In this case, for example, Alice's attempt to access URL 316 with her browser will be allowed, because her request has been associated with an attempt to access a NEWS site, which is a permissible use. Cache 310 is also updated to include the returned category and URL 316 (i.e., its MD5 hash).

Now suppose that instead of reporting an ACCEPT, bloom filter 308 either reports a REJECT (indicating with 100% certainty that URL 316 is not present in database 312), or that the ACCEPT reported by bloom filter 308 was a false positive (i.e., a query of database 312 for URL 316 fails). The next phase of evaluation performed by the management plane (in either case) is to consult cache 314 to see if URL 316 is present therein. Cache 314 is associated with queries performed by appliance 102 against a set of one or more remote URL classification servers. As with the previous phases, if URL 316 is present in cache 314, the corresponding category (e.g., "NEWS") will be returned as a result and can be used by the firewall in policy enforcement (and included in cache 306). If URL 316 is also absent in cache 314, one or more remote URL classification servers, such as URL classification server 320, is queried. In some embodiments, server 320 is an Amazon Cloud URL query server, which queries URL category information using a Trie structure lookup. In some embodiments, URL classification server 320 is made available by the provider of the contents of database 312, and contains URL information that supplements the information included in database 312 (e.g., by including many millions of additional URLs and corresponding categories). As one example, URL classification server 320 can be provided by URL classification system 150 (e.g., as component 168). URL classification server 320 can also be under the control of the owner of appliance 102 or any other appropriate party. Further, a set of multiple URL classification servers can be queried by appliance 102, whether in parallel, in sequence (e.g., if a first queried URL classification server has no results, appliance 102 contacts a different URL classification server), selectively, etc. In various embodiments, a bloom filter corresponding to the data stored by URL classification server 320 is included in appliance 102.

In the event that URL 316 is also absent from URL server 320 (and any additional URL servers available to appliance 102 as applicable), a category of UNKNOWN will be returned and appropriate policies applied, based on the category, such as by blocking access to URL 316. Cache 306 can also be updated by switching the temporary category of UNRESOLVED to UNKNOWN. As with cache 310, cache 314 is updated based on results returned by URL server 320. In some embodiments, URLs with UNKNOWN categorization have a timeout, thus allowing for resolution of the categorization during a subsequent request.

Handling Misclassified URLs

In various of the foregoing examples, Alice has been attempting to access site 118 (the website of a national newspaper). Site 118 (reachable, e.g., via URL 316) is correctly classified as being a NEWS site (e.g., as classified in database 312, server 320, etc.). Suppose that Alice is reading an article on site 118 about a new treatment for breast cancer being developed by a team of universities. Included in the article on site 118 is a link to site 120, which has additional information about the treatment. Suppose site 120 is a specialized news website, which aggregates press releases and other news articles from universities. Alice clicks on the link to site 120 from the article served by site 118, but, to her surprise, instead of being taken to site 120, she is shown a page provided by appliance 102 indicating that her attempt to access site 120 has been blocked. In particular, the page provided by appliance 102 to client 104 indicates that site 120 is an adult website (e.g., is classified in database 312 as ADULT).

There are a variety of reasons why a website may be misclassified. As one example, a page initially serving one kind of content (e.g., correctly classified as a GAMBLING site on Jun. 1, 2016) might, over time, evolve into a different kind of site serving different content (e.g., more appropriately classified as SPORTS once the ability for visitors to place bets is removed on Dec. 1, 2016). When such a site is initially categorized (e.g., by URL classification system 150), the site will receive an initial categorization (e.g., GAMBLING). Suppose URL classification system 150 includes classification information on approximately 500 million URLs, and that URL classification system 150 has the resources to collectively crawl new sites and recrawl known sites (enumerated in crawler database 176) at the rate of approximately one million total sites per day. Absent a report of a problem (e.g., the website being blocked erroneously), classification system 150 may not recrawl the site frequently enough to determine that the correct categorization for the site as of Dec. 1, 2016 is SPORTS (e.g., a recrawl might not otherwise be scheduled until the end of 2017 or later).

Sites can also be misclassified because the models used to evaluate them are imperfect (e.g., due to insufficient training data, or other limitations of the model). As one example, suppose that when classification system 150 first crawled site 120 (e.g., on Jun. 15, 1999), classification system 150 used a first URL classification model (model 154). Over time, as improvements are made to natural language processing, machine learning, and other technologies, classification system 150 has adopted more refined/improved URL classification models in production. In the example illustrated in FIG. 1, the model currently used to categorize websites is model 156. If site 120 were crawled by system 150 today (using current model 156), and/or whenever a scheduled recrawl of site 120 happens (using current model 156 or a future-developed model), the classification of site 120 would be NEWS. Unfortunately, the last time site 120 was crawled by system 150, an older model (that was at the time the most current model) determined it to be ADULT, resulting in Alice being blocked from accessing site 120 by appliance 102. If a model (e.g., model 154) makes a mistake on a site such as site 120, it is highly likely to make the same mistake with respect to sites that are sufficiently similar to site 120 (e.g., site 122). Thus, sites that were also crawled by the earlier model, and are similar to site 120, are likely to have also been categorized as ADULT instead of NEWS, whereas if those similar sites were crawled using the current model, they would be correctly classified as NEWS.

Figure 4:
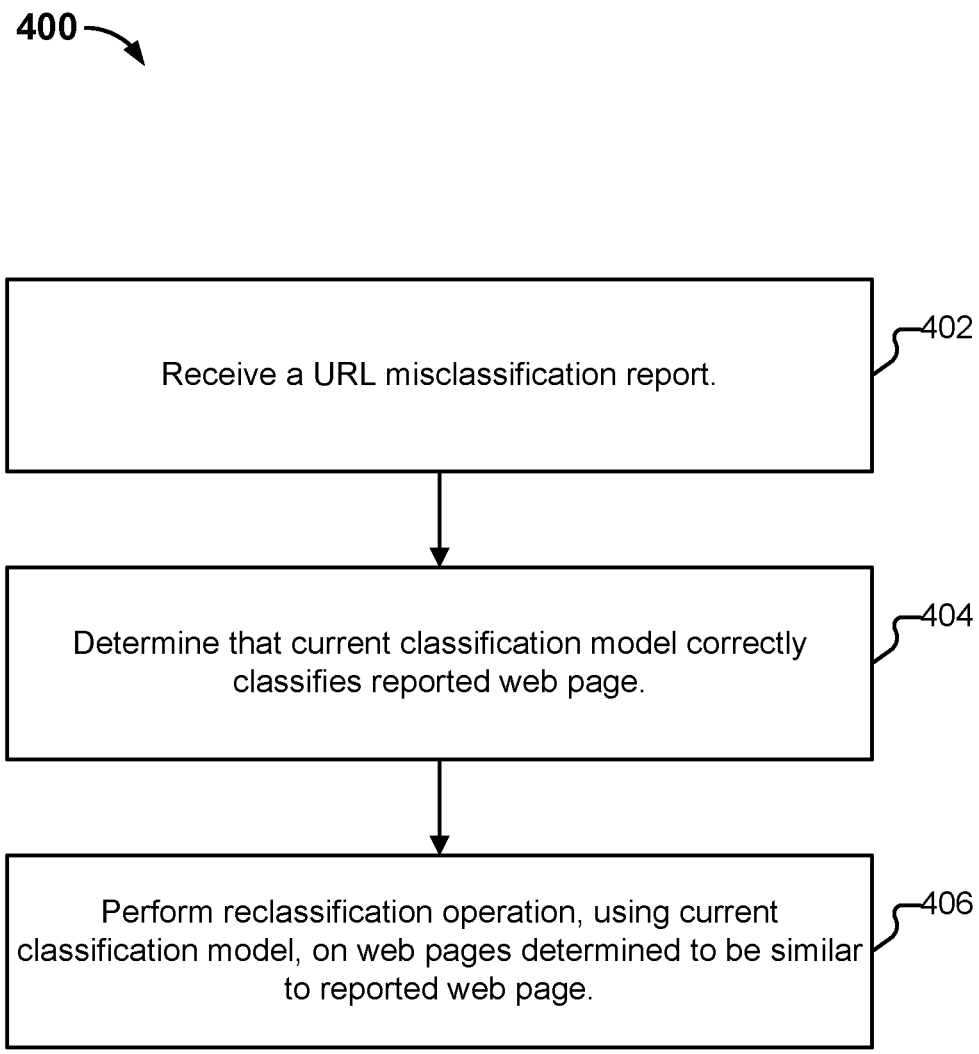
FIG. 4 illustrates an embodiment of a process for reclassifying URLs.

As mentioned above, where a corpus of total URLs classified by system 150 is in the hundreds of millions, and where the number of pages that can be processed by system 150 in a given day represents a significantly smaller portion (e.g., one million or less), it will likely not be feasible (or possibly desirable) to recrawl every single page previously classified by an older model to correct classification errors. Further, many (if not most) of the sites classified by a previous model will have been correctly classified, and automatically reclassifying them with a newer model (when they are already correctly classified) represents a potentially significant amount of wasted effort. Accordingly, improvements in efficiently determining which pages to reclassify are beneficial. Further, even where resources are not constrained, such improvements can be beneficial, for example, with respect to certain sites (e.g., very popular websites) that are sensitive to (and potentially hostile to) frequent recrawling. Various techniques for efficiently handling misclassified URLs are provided below, in conjunction with FIG. 4, which illustrates an embodiment of a process for reclassifying URLs. In various embodiments, the process shown in FIG. 4 is performed by URL classification system 150.

Handling Misclassified URLs

Included in the error page provided by appliance 102 to Alice's browser (on client 104) is a dialog box that lets Alice report the classification of site 120 as incorrect, and also to optionally supply (e.g., from a dropdown, an input box, etc.) a suggested correct categorization for the site (e.g., NEWS).

Process 400 begins at 402 when a website (URL) misclassification report is received. As one example, when Alice interacts with the web page served to her by appliance 102 indicating that she has been blocked from accessing site 120, appliance 102 provides a report to system 150 indicating that site 120 is potentially misclassified. As explained above, the report can optionally include a suggested category (e.g., "NEWS"). The report can be provided to system 150 in a variety of ways, including, for example, via an API, an email submission, a web form submission, or any other appropriate mechanism (depicted collectively in FIG. 1 as change request interface 158). As another example, in various embodiments, system 150 makes available a web front end (another example of change request interface 158), into which URLs can be provided, and classification information returned. If the classification returned by system 150 is incorrect, a misclassification report can be submitted via the web front end. As one example, suppose an individual accesses change request interface 158 with a browser and provides a URL (e.g., "www.whitehouse.gov"). Classification system 150 responds with a classification (e.g., GOVERNMENT). Classification system 150 will also include with the result an option to report a problem with the classification. For example, if a site is most appropriately classified as BUSINESS, but is currently incorrectly classified as SPORTS by system 150, the misclassification can be reported to system 150 via direct interaction with system 150 (and irrespective of whether the misclassification would result in blocking by appliance 102).

When system 150 receives a misclassification report (e.g., via interface 158), change request handler 160 calls a single page classifier 162, which uses the current production classification model (e.g., model 156) to crawl and classify the URL included in the report. When, for example, Alice's report regarding the misclassification of site 120 is received by system 150, single page classifier 162 will crawl URL 316, extracting metadata/content from site 120, and classify site 120 using model 156. The results of the processing performed by single page classifier 162 (e.g., crawled metadata/content, Alice's suggested category, model 156's classification, and the previous classification result) are stored in change request database 164. As one example, such information can be stored in a change request table in database 164 (which is, in some embodiments a MongoDB). Other information can also be included in database 164 (e.g., in a change request status table), such as the identity of the requester (e.g., Alice, ACME, or ACME Appliance 102, as applicable), the final resolution of the misclassification report (e.g., "fixed" where system 150 automatically confirms that the URL was misclassified or "escalated" where system 150 cannot automatically confirm that the URL was misclassified), and a log of the events that occur prior to the final resolution of the misclassification report (e.g., misclassification report received at time 1, single page classifier dispatched at time2, etc.).

In some embodiments, if the current classification of a page (using the current model) confirms the previous classification (e.g., a site previously classified as ADULT using a previous model is also classified as ADULT by the current model), reclassification processing ends (i.e., system 150 concludes that the site is not misclassified). In other embodiments, other actions can be taken, such as escalating the misclassification report to an administrator of system 150 or another appropriate entity for manual review.

Suppose the classification of the reportedly misclassified URL changes from the previous classification (e.g., site 120 being ADULT) to a different classification (e.g., NEWS) when classified using current model 156. In some embodiments, the change of classification is used (e.g., by change request handler 160) as a sufficient indication that a previously incorrect classification is now correct (404). In other embodiments, a further constraint on determining that the current model's classification is correct is that the current classification match the suggested classification included in the misclassification report (e.g., match Alice's suggestion that site 120 be classified as NEWS).

Since the current model (156) has improved over previous models to correctly classify a previously misclassified website, it is possible that other sites (similar to the misclassified website and also previously classified by an older model) are currently misclassified as well, and will be correctly classified if the current model is used instead. Alice's reporting of a single misclassified site can be used to help automatically surface and correct other (e.g., unreported) sites that are likely to be similarly misclassified. Accordingly, in response to a determination that a previously misclassified site is now correctly classified (404), sites that are determined to be similar to the misclassified site are reclassified using the current model (406). One approach to performing the processing at 406 is as follows.

As explained above, when crawlers 152 crawl/recrawl sites to populate/update the information included in classified site database 166, information they collect is also used to populate/update the information included in similar site index 172. When change request handler 160 determines that a misclassification has been corrected through the use of a newer model, in some embodiments, change request handler 160 alerts recrawl engine 174, providing as input, the now correctly classified URL (also referred to herein as a "seed site"). In other embodiments, the functionality of recrawl engine 174 and change request handler 160 are combined into a single logical element.

Recrawl engine 174 searches similar site index 172 for the n websites (e.g., 100) most similar to site 120. Those websites are added by recrawl engine 174 to crawler database 176, and each will be recrawled (e.g., by crawlers 152) and classified (e.g., by classifier 170) using the current model (156). As mentioned above, in some embodiments, Apache Lucene is used to build/maintain similar site index 172. Lucene can also be used to perform searches against the similar site index (e.g., for the 100 sites most similar to site 120). One way to determine the 100 websites most similar to site 120 is as follows. Given a site (e.g., site 120), tokens for the site are determined (where examples of tokens include terms appearing in site metadata as well as terms appearing as page content). The tokens are used as search terms into similar site index 172, and the top 100 results (100 URLs) are returned to recrawl engine 174 which adds them to crawler database 176.

A variety of approaches can be used to supply the tokens as search terms. As one example, where the seed site includes at least 10 distinct tokens in its metadata, just the metadata is used as input when searching similar site index 172. An example of such a seed site is imdb.com, which has the following tokens (in word:frequency format) in metadata: and:3 imdb:2 movie:2 tv:2 movies:2 source:1 the:1 popular:1 most:1 content:1 actresses:1 films:1 actors:1 quotes:1 stars:1 for:1 directors:1 database:1 celebrity:1 authoritative:1 celebrities:1 hollywood:1.

A query of similar site index 172 using the above tokens results in the following similar sites (truncated to the first few examples): internetmoviedatabase.com, imdb.bg, media-imdb.com, www.imdb.me, plus-imdb.com, movietrendsdb.com, mydigitalthings.com, filmcanyon.com, germancarsnews.ru, mtdbc.com . . . .

Where the seed site includes fewer than 10 distinct tokens in its metadata, tokens from the body text can also be included as search terms when searching similar site index 172. An example of such a seed site is stackexchange.com, which has the following metadata tokens: stack:1 questions:1 exchange:1 hot:1. The following is a truncated list of body text words for stackexchange.com: professionals:39 need:19 using:13 newsletters:8 madden:10 higher:13 associate:10 feedback:7 story:10 time:6 free:10 designers:26 place:6 serious:13 comic:10 how:13 under:5 answer:7 git:10 gis:13 always:7 log:9 grace:10 system:13 floor:9 enrolled:13 . . . .

A query of similar site index 172 using both the metadata tokens and the body text tokens for stackexchange.com results in the following similar sites (truncated to the first few examples): askubuntu.com, stackapps.com, mathoverflow.net, superuser.com, www.nothingtoinstall.com . . . .

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
in response to receiving a website misclassification report comprising a user-reported indication that access to a first URL, having an associated first domain, is erroneously blocked, wherein the first URL was previously assigned a categorization associated with at least a first subject matter topic based on content analysis performed by an original classification model, use a single page classifier to perform a recrawl-reclassification operation on the first URL using a current classification model that is an updated version of the original classification model, to determine at least one current subject matter topic and assign a current categorization for the first URL; and
determine that there is at least one discrepancy among at least two of: the first categorization, the current categorization, or information included in the misclassification report, and take a remedial action in response to the determination, wherein the remedial action includes at least one of: (1) initiating an escalation event when the first categorization and the result of the recrawl-reclassification operation are in agreement, or (2) assigning the current categorization to the URL when the current categorization is different from the first categorization and initiating a recrawl-reclassification operation on at least one additional domain; and a memory coupled to the processor and configured to provide the processor with instructions.

2. The system of claim 1, wherein the website misclassification report is received in response to the user interacting with a security appliance.

3. The system of claim 1, wherein the website misclassification report is received at least in part as a URL input, by the user, into an interactive form served by the system.

4. The system of claim 1, wherein the website misclassification report includes a second categorization as a suggested correct classification for the first URL.

5. The system of claim 1, wherein the determination of whether the current classification model correctly classifies the first URL includes determining whether the current classification model's classification matches a suggested classification provided with the website misclassification report.

6. The system of claim 1, wherein the system is further configured to classify a corpus of documents and further configured to generate an index comprising a subset of documents included in the corpus.

7. The system of claim 6, wherein the corpus includes websites classified as malicious and wherein the index does not include websites classified as malicious.

8. The system of claim 6, wherein the corpus includes websites classified as phishing and wherein the index does not include websites classified as phishing.

9. The system of claim 6, wherein the corpus includes websites that result in a soft 404 error message when an access attempt is made and wherein the index does not include websites that result in a soft 404 error message when an access attempt is made.

10. A method, comprising:
in response to receiving a website misclassification report comprising a user-reported indication that access to a first URL, having an associated first domain, is erroneously blocked, wherein the first URL was previously assigned a categorization associated with at least a first subject matter topic based on content analysis performed by an original classification model, using a single page classifier to perform a recrawl-reclassification operation on the first URL using a current classification model that is an updated version of the original classification model, to determine at least one current subject matter topic and assign a current categorization for the first URL; and
determining that there is at least one discrepancy among at least two of: the first categorization, the current categorization, or information included in the misclassification report, and taking a remedial action in response to the determination, wherein the remedial action includes at least one of: (1) initiating an escalation event when the first categorization and the result of the recrawl-reclassification operation are in agreement, or (2) assigning the current categorization to the URL when the current categorization is different from the first categorization and initiating a recrawl-reclassification operation on at least one additional domain.

11. The method of claim 10, wherein the website misclassification report is received in response to the user interaction with a security appliance.

12. The method of claim 10, wherein the website misclassification report is received at least in part as a URL input, by the user, into an interactive form served by the system.

13. The method of claim 10, wherein the website misclassification report includes a second categorization as a suggested correct classification for the first URL.

14. The method of claim 10, wherein the determination of whether the current classification model correctly classifies the first URL includes determining whether the current classification model's classification matches a suggested classification provided with the website misclassification report.

15. The method of claim 10, further comprising classifying a corpus of documents and generating an index comprising a subset of documents included in the corpus.

16. The method of claim 15, wherein the corpus includes websites classified as malicious and wherein the index does not include websites classified as malicious.

17. The method of claim 15, wherein the corpus includes websites classified as phishing and wherein the index does not include websites classified as phishing.

18. The method of claim 15, wherein the corpus includes websites that result in a soft 404 error message when an access attempt is made and wherein the index does not include websites that result in a soft 404 error message when an access attempt is made.

19. A computer program product embodied in a non-transitory tangible computer readable storage medium and comprising computer instructions for:
in response to receiving a website misclassification report comprising a user-reported indication that access to a first URL, having an associated first domain, is erroneously blocked, wherein the first URL was previously assigned a categorization associated with at least a first subject matter topic based on content analysis performed by an original classification model, using a single page classifier to perform a recrawl-reclassification operation on the first URL using a current classification model that is an updated version of the original classification model, to determine at least one current subject matter topic and assign a current categorization for the first URL; and
determining that there is at least one discrepancy among at least two of: the first categorization, the current categorization, or information included in the misclassification report, and taking a remedial action in response to the determination, wherein the remedial action includes at least one of: (1) initiating an escalation event when the first categorization and the result of the recrawl-reclassification operation are in agreement, or (2) assigning the current categorization to the URL when the current categorization is different from the first categorization and initiating a recrawl-reclassification operation on at least one additional domain.

* * * * *